(12) United States Patent
Kim et al.

(10) Patent No.: US 8,570,454 B2
(45) Date of Patent: Oct. 29, 2013

(54) THIN FILM TRANSISTOR SUBSTRATE AND LIQUID CRYSTAL DISPLAY DEVICE HAVING THE SAME

(75) Inventors: Kyung-hoon Kim, Uiwang-si (KR); Keun-woo Park, Seoul (KR); Kook-chul Moon, Yongin-si (KR); Pil-mo Choi, Seoul (KR); Chul-ho Kim, Yongin-si (KR); Ho-suk Maeng, Seoul (KR); Sang-hoon Lee, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/525,088

(22) Filed: Jun. 15, 2012

(65) Prior Publication Data

US 2012/0319124 A1    Dec. 20, 2012

Related U.S. Application Data

(62) Division of application No. 12/018,576, filed on Jan. 23, 2008, now Pat. No. 8,223,307.

(30) Foreign Application Priority Data

Feb. 20, 2007   (KR) .................. 10-2007-0017042

(51) Int. Cl.
*G02F 1/1343* (2006.01)
(52) U.S. Cl.
USPC ............................................. 349/39; 349/38
(58) Field of Classification Search
USPC ..................................................... 349/38–39
See application file for complete search history.

(56) References Cited

U.S. PATENT DOCUMENTS

| | | | | |
|---|---|---|---|---|
| 6,038,003 A | * | 3/2000 | Kim | 349/43 |
| 6,335,770 B1 | * | 1/2002 | Komatsu | 349/38 |
| 7,414,694 B2 | | 8/2008 | Furukoshi | |
| 7,948,588 B2 | | 5/2011 | Yang et al. | |
| 2005/0190312 A1 | * | 9/2005 | Yang | 349/38 |

FOREIGN PATENT DOCUMENTS

| | | |
|---|---|---|
| JP | 2000-227611 | 8/2000 |
| JP | 2003-241687 | 8/2003 |
| KR | 1020020057050 | 7/2002 |

* cited by examiner

*Primary Examiner* — Phu Vu
(74) *Attorney, Agent, or Firm* — Innovation Counsel LLP

(57) ABSTRACT

A display device with a display region and a non-display region surrounding the display region, the display device comprising: a first substrate and a second substrate. The first substrate comprises: a first insulating substrate; a gate and data line formed on the first insulating substrate; a pixel thin film transistor formed on the display region and electrically connected to the gate line; a pixel electrode electrically connected to the pixel thin film transistor; a gate driver formed on the non-display region and connected to the gate line; and a direct current (DC)/DC converter formed on the non-display region and having a capacitance part. The capacitance part includes: a first capacitance part with a first electrode, a first dielectric layer, and a second electrode; and a second capacitance part with the second electrode, a second dielectric layer, and a third electrode.

15 Claims, 18 Drawing Sheets

THIN FILM TRANSISTOR SUBSTRATE AND LIQUID CRYSTAL DISPLAY DEVICE HAVING THE SAME

CROSS-REFERENCE TO RELATED APPLICATIONS

This application is a divisional Patent Application of U.S. patent application Ser. No. 12/018,576, filed Jan. 23, 2008, which application claims priority to and the benefit of Korean Patent Application No. 10-2007-0017042, filed on Feb. 20, 2007 in the Korean Intellectual Property Office, the entire contents of which are incorporated herein by their references.

BACKGROUND OF INVENTION

1. Field of Invention

The present invention relates to a liquid crystal display having a thin film transistor substrate and, more particularly, to a thin film transistor substrate formed with a direct current (DC)/DC converter thereon.

2. Description of the Related Art

A liquid crystal display device includes a liquid crystal display panel and a back light unit. The liquid crystal display panel includes a first substrate formed with a thin film transistor, a second substrate opposite to the first substrate, and a liquid crystal layer sandwiched between the first and second substrates. The liquid crystal display panel is incapable of emitting light by itself and receives light from the back light unit placed in the back of the first substrate.

The first substrate is formed with a gate line, a data line and a thin film transistor connected with the gate and data lines. The thin film transistors are connected to respective pixels and are individually controlled.

To reduce production costs, the gate driver, data driver and DC/DC converter are sometimes directly formed on the first substrate. Among the circuits to be formed on the first substrate, a capacitor is necessary to the DC/DC converter. However, the DC/DC converter requires a relatively large area to form the converter.

SUMMARY OF THE INVENTION

Accordingly, it is an aspect of the present invention to provide a liquid crystal display device including a DC/DC converter that can be mounted on a thin film transistor substrate without requiring a relatively large area.

Additional aspects of the present invention will be set forth in part in the description which follows and, in part, will be obvious from the description, or may be learned by practice of the present invention.

In accordance with aspects of the present invention a liquid crystal display device having a display region and a non-display region surrounding the display region, includes: a pixel thin film transistor formed on the display region and electrically connected to gate and data lines; a gate driver formed on the non-display region to drive the gate line; and a direct current (DC)/DC converter formed on the non-display region that includes a converter thin film transistor and a capacitance part; the capacitance part including: a first capacitance part which includes a first electrode, a first dielectric layer formed on the first electrode, and a second electrode formed on the first dielectric layer; and a second capacitance part which includes the second electrode, a second dielectric layer formed on the second electrode, and a third electrode formed on the second dielectric layer.

According to an aspect of the invention, the first electrode and the third electrode are electrically connected with each other.

According to an aspect of the invention, the first dielectric layer and the second dielectric layer are formed with contact holes to expose the first electrode, and the third electrode contacts the first electrode through the contact hole.

According to an aspect of the invention, the first electrode is formed on the same layer with the gate line, the second electrode is formed on the same layer with the data line, and the third electrode is formed on the same layer with the pixel electrode.

According to an aspect of the invention, the pixel thin film transistor includes a semiconductor layer including poly silicon.

According to an aspect of the invention, the semiconductor layer includes a source region, a drain region, and a channel region between the source region and the drain region, the pixel thin film transistor includes: a first insulating layer formed on the semiconductor layer; a gate electrode formed on the first insulating layer corresponding to the channel region and connected to the gate line; a second insulating layer formed on the gate electrode; a drain electrode formed on the second insulating layer connected to the pixel electrode and a source electrode electrically connected to the data line.

According to an aspect of the invention, the first substrate further includes a third insulating layer formed on the source electrode and the drain electrode.

According to an aspect of the invention, the third insulating layer is formed with a contact hole to expose the drain electrode, and the pixel electrode contacts the drain electrode through the contact hole.

According to an aspect of the invention, the third insulating layer includes an organic layer.

According to an aspect of the invention, the second dielectric layer is thinner than the third insulating layer.

According to an aspect of the invention, the pixel electrode includes: a transmissive region which transmits light incident to a bottom of the first insulating substrate; and a reflective region which reflects light incident to a top of the second insulating substrate, and the organic layer placed in the reflective region and a surface of the second dielectric layer are formed with a lens part.

According to an aspect of the invention, the second substrate includes: a second insulating substrate; and a common electrode which is formed on the second insulating substrate and does not face the third electrode.

According to an aspect of the invention, at least one of the common electrode and the pixel electrode is formed with a domain defining member, and the liquid crystal layer is in a vertical alignment (VA) mode.

According to an aspect of the invention, a part of power output from the DC/DC converter is supplied to the gate driver.

According to an aspect of the invention, the gate driver includes: a shift register; and a level shifter that is placed between the shift register and the gate line and applies a gate-on voltage and a gate-off voltage to the gate line.

According to an aspect of the invention, at least a part of the power output from the DC/DC converter is supplied to the level shifter.

The foregoing and/or other aspects of the present invention can be achieved by providing a thin film transistor substrate including: an insulating substrate; a first electrode which is formed on the insulating substrate; a first dielectric layer which is formed on the first electrode; a second electrode which is formed on the first dielectric layer; a second dielectric layer which is formed on the second electrode; and a third electrode which is formed on the second dielectric layer and electrically connected to the first electrode.

According to an aspect of the invention, the first dielectric layer includes at least two sub-layers.

According to an aspect of the invention, the second dielectric layer includes at least two sub-layers.

According to an aspect of the invention, the third electrode includes a transparent conductive layer.

According to an aspect of the invention, the first dielectric layer and the second dielectric layer are formed with a contact hole; and the first electrode and the third electrode are electrically connected to each other through the contact hole.

According to an aspect of the invention, the thin film transistor substrate further includes: an insulating layer between the insulating substrate and the first electrode.

According to an aspect of the invention, the second dielectric layer includes an organic layer.

According to an aspect of the invention, the thin film transistor substrate further includes a pixel electrode which includes a gate wiring including a gate electrode, a data wiring including a source electrode and a drain electrode, and a pixel electrode electrically connected to the drain electrode, wherein the gate wiring is formed on the same layer with the first electrode, the data wiring is formed on the same layer with the second electrode, and the pixel electrode is formed on the same layer with the third electrode.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION

Reference will now be made in detail to the embodiments of the present invention, examples of which are illustrated in the accompanying drawings, wherein it will be understood that when a film or a layer is referred to as being "on" another film or layer, it can be directly on the other film or layer, or interleaving films or layers may be present.

A liquid crystal display device according to an exemplary embodiment of the present invention will be described with reference to FIGS. 1 through 5.

Figure 1:
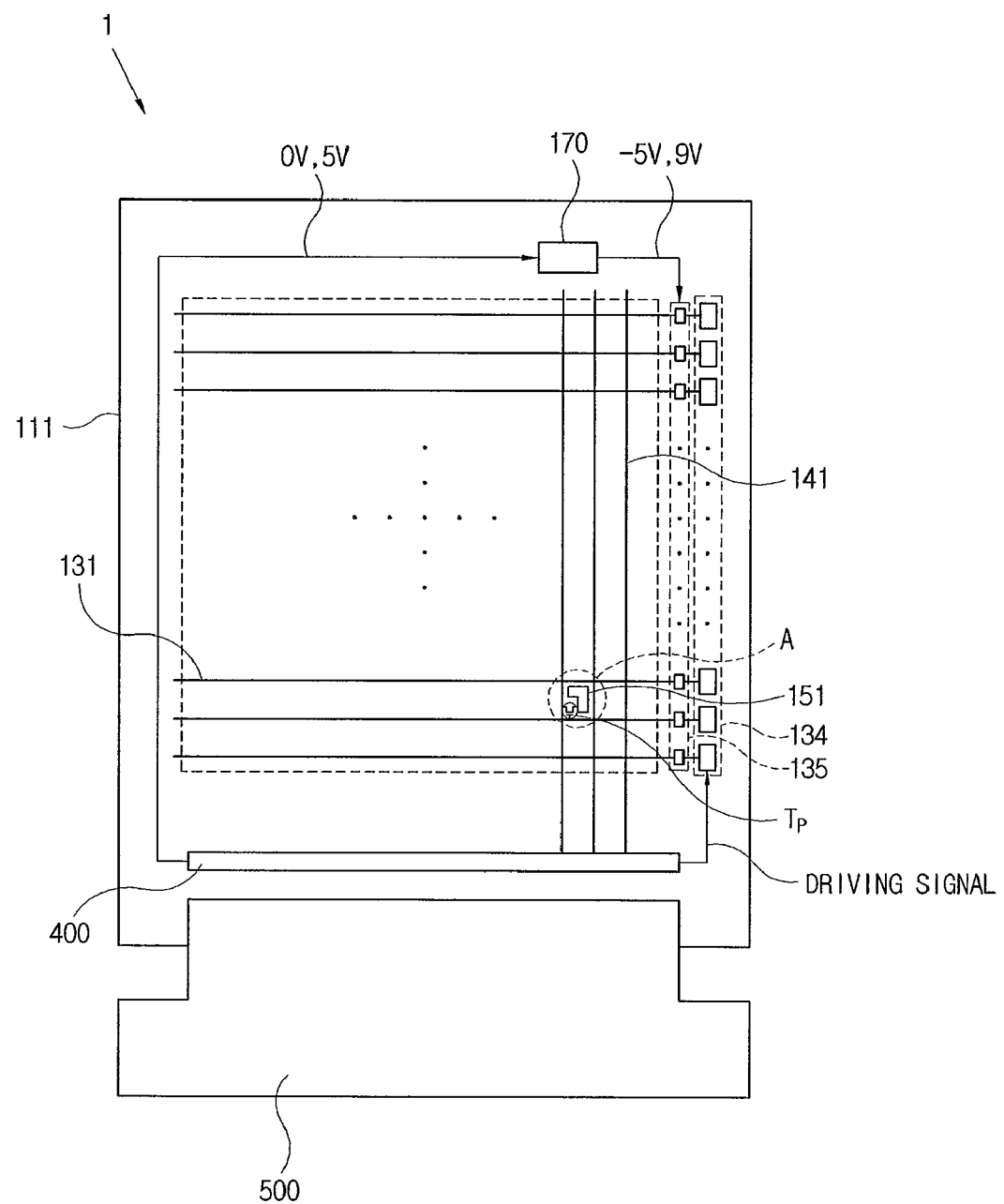
FIG. 1 is a layout diagram of a liquid crystal display device according to a first exemplary embodiment of the present invention.
Figure 2:
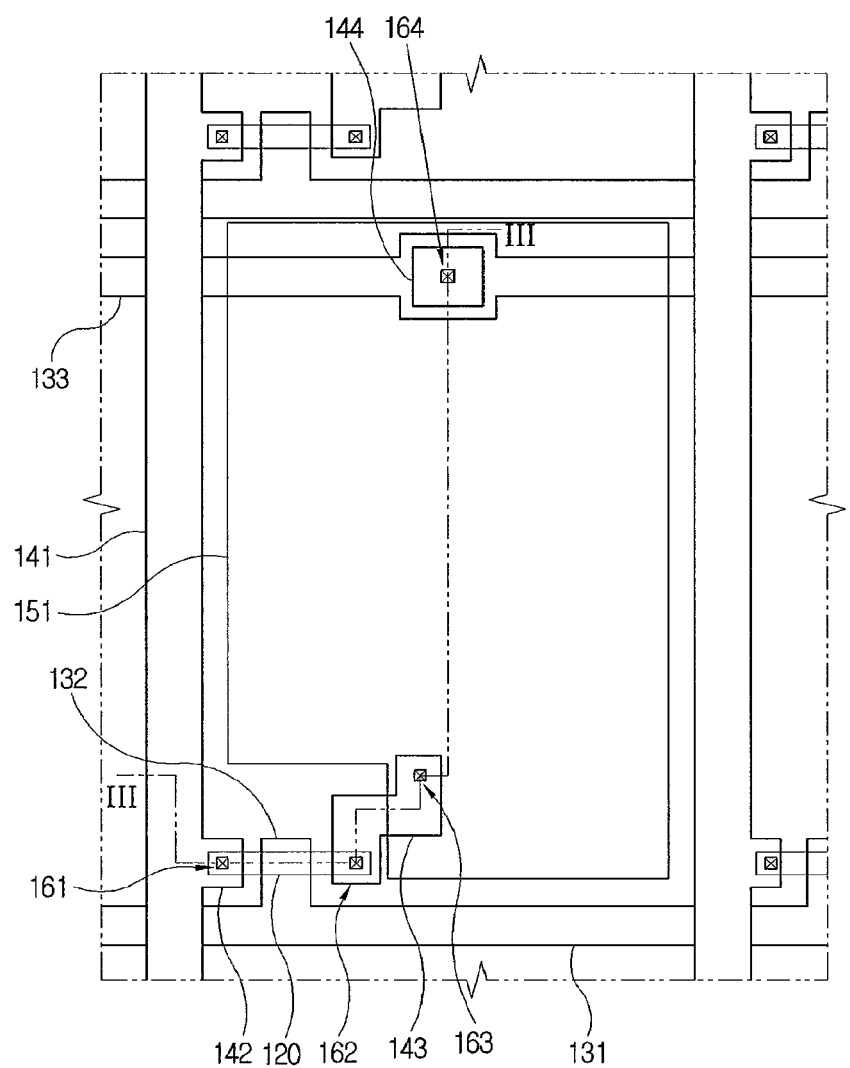
FIG. 2 is an enlarged view of an "A" part in FIG. 1.
Figure 3:
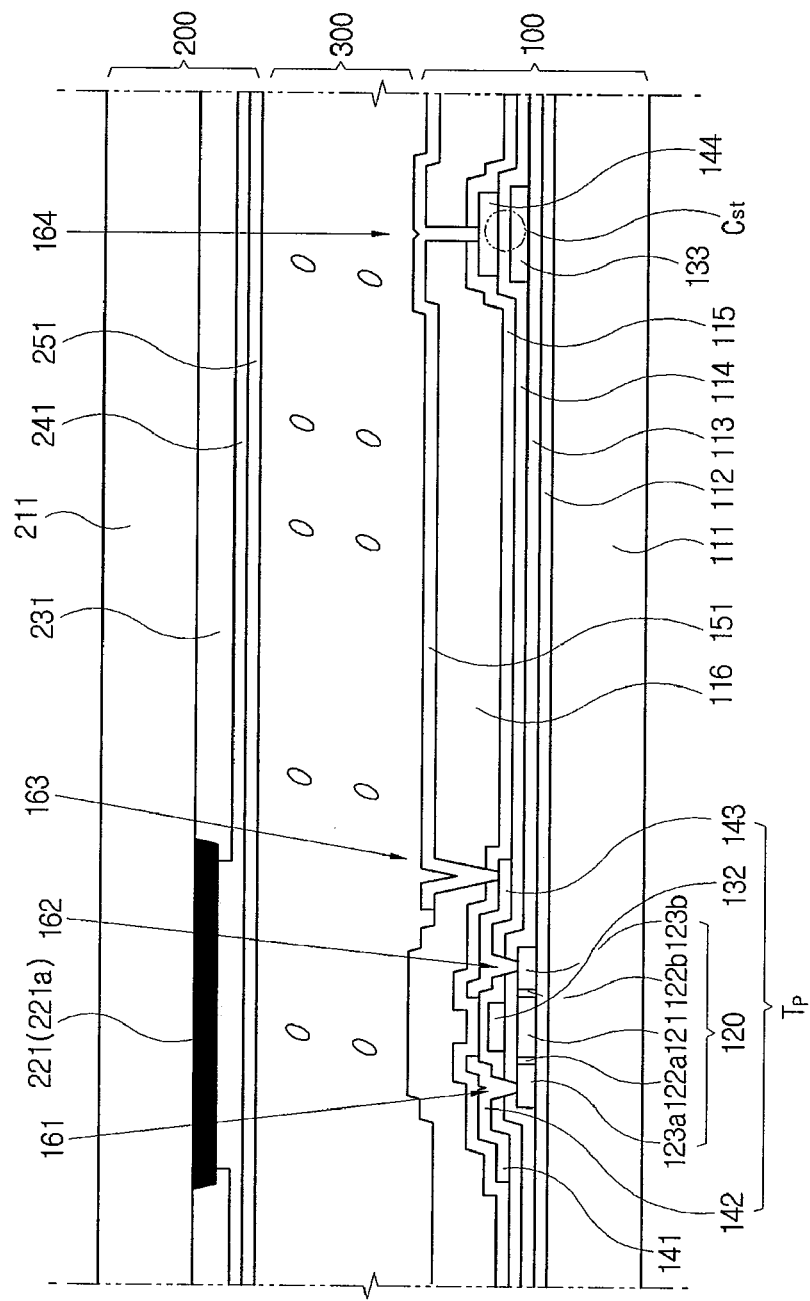
FIG. 3 is a sectional view taken along line III-III in FIG. 2.

Referring to FIGS. 1 and 3, a liquid crystal display device 1 includes a first substrate 100, a second substrate 200 facing the first substrate 100, a liquid crystal layer 300 sandwiched between the first and second substrates 100 and 200, a driving chip 400 mounted onto a non-display region of the first substrate 100, and a circuit board 500 attached to the first substrate 100 as being connected to the driving chip 400.

Further, the liquid crystal display device 1 includes a sealant (not shown) placed in the non-display region along a circumference of a display region and making the first and second substrates 100 and 200 adhere to each other.

As shown in FIG. 1, a gate line 131 and a data line 141 intersect each other in the display region, and a pixel thin film transistor Tp is formed in the region where the gate line 131 and the data line 141 intersect. The pixel thin film transistor Tp is electrically connected to the gate line 131 and the data line 141. A pixel electrode 151 is connected to the pixel thin film transistor Tp.

The gate line 131 receives a gate driving signal through gate drivers 134 and 135 placed in the right non-display region. The gate driving signal includes a gate-on voltage and a gate-off voltage. The gate drivers 134 and 135 include a shift register 134 and a level shifter 135.

The shift register 134 and the level shifter 135 are formed while forming the pixel thin film transistor Tp, and include thin film transistors (not shown).

The shift register 134 receives a driving signal from the driving chip 400, and applies the driving signal to the gate line 131. The level shifter 135 placed between the shift register 134 and the gate line 131 applies the gate-off voltage and the gate-on voltage adapted for driving the pixel thin film transistor Tp to the gate line 131 on the basis of the driving signal received from the shift register 134.

For example, the gate-off voltage applied from the level shifter 135 to the gate line 131 may be about −5V, and the gate-on voltage may be about 9V.

A DC/DC converter 170 placed in the non-display region supplies power to the level shifter 135. The DC/DC converter 170 receives initial voltages (e.g., 0V and 5V) from the driving chip 400, and converts them into −5V and 9V, thereby applying the converted voltages to the level shifter 135.

The DC/DC converter 170 is also formed while forming the pixel thin film transistor Tp. The DC/DC converter 170 is formed on the first substrate 100 so that there is no need of a separate DC/DC converting circuit, thereby simplifying the driving chip 400.

Figure 4:
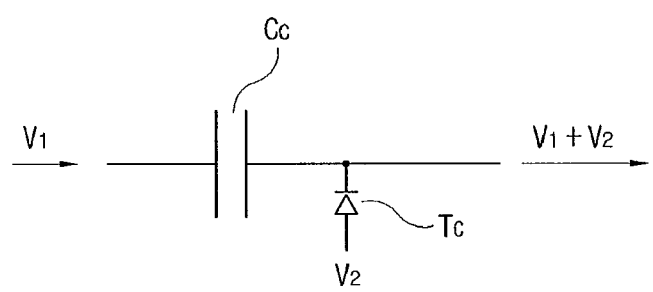
FIG. 4 is a circuit diagram of a DC/DC converter in the liquid crystal display device according to the first exemplary embodiment of the present invention.

FIG. 4 is a circuit diagram of the DC/DC converter 170. The DC/DC converter 170 includes a converter capacitance part Cc (hereinafter, referred to as a capacitance part), and a converter thin film transistor Tc. The converter thin film transistor Tc has a similar structure to the pixel thin film transistor Tp (to be described later). The converter thin film transistor Tc of the DC/DC converter 170 plays the role of a diode.

FIG. 4 illustrates an exemplary schematic circuit of the DC/DC converter 170, but not limited thereto. Alternatively, the DC/DC converter 170 may additionally include a buffer circuit that increases the intensity of input power, and the like.

The DC/DC converter 170 operates as follows.

The capacitance part Cc is charged with a voltage V1 supplied from the input power. The charged voltage V1 is added to a voltage of V2 which is supplied through the converter thin film transistor Tc, thereby generating a voltage of V1+V2.

On the first substrate 100, a wiring (not shown) is formed to connect the driving chip 400 and the DC/DC converter 170, to connect the DC/DC converter 170 and the level shifter 135, and to connect the driving chip 400 and the shift register 134.

Referring to FIGS. 1, 2, 3 and 5, the first substrate 100 is formed as follows.

A buffer layer 112 made of silicon oxide is formed on a first insulating substrate 111 which is made of quartz or glass. The buffer layer 112 prevents alkali metal or the like included in the first insulating substrate 111 from mixing into the silicon layer while it is crystallizing.

A semiconductor layer 120 made of poly silicon is formed on buffer layer 112, and includes a channel region 121. Lightly-doped domains (LDD) 122a and 122b are divided with respect to the channel region 121.

Source and drain regions 123a and 123b are placed outside the LDDs 122a and 122b, respectively.

The LDDs 122a and 122b are lightly doped with n-type impurities (i.e., n– doping), and used for scattering hot carriers. On the other hand, the channel region 121 is not doped with impurities, and the source/drain regions 123a and 123b are heavily doped with the n-type impurities (i.e., n+ doping).

A first insulating layer 113 including silicon oxide or silicon nitride is formed on the semiconductor layer 120. The first insulating layer 113 is also called a gate insulating layer.

A gate wiring is formed on the first insulating layer 113. The gate wiring may be a single layer or multi layers including metal. The gate wiring includes a gate line 131 arranged horizontally, a gate electrode 132 connected to the gate line 131, a storage electrode line 133 extended parallel with the gate line 131, and a first electrode 136 forming the capacitance part Cc.

A second insulating layer 114 is formed on the gate wiring. The second insulating layer 114 is made of a single layer of silicon nitride or silicon oxide, or a double layer of silicon nitride/silicon oxide. Meanwhile, the second insulating layer 115 may be also called an interlayer dielectric (ILD).

The first insulating layer 113 and the second insulating layer 114 are formed with a contact hole 161 to expose the source region 123a and a contact hole 162 to expose the drain region 123b, respectively.

A data wiring is formed on the second insulating layer 114. The data wiring includes a data line 141 arranged vertically and intersecting the gate line 131 to form a pixel, a source electrode 142 branched from the data line 141 and extended over the source region 123a, a drain electrode 143 separated from the source electrode 142 and extended over the drain region 123b, a storage capacitor auxiliary layer 144 formed on the storage electrode line 133 like an island, and a second electrode 145 forming the capacitance part Cc.

The source electrode 142 contacts the source region 123a through the contact hole 161, and the drain electrode 143 contacts the drain region 123b through the contact hole 162.

Third insulating layers 115 and 116 are formed on the data wiring. The third insulating layers 115 and 116 includes a lower passivation layer 115 made of silicon nitride, and an upper organic layer 116 made of an organic material.

The organic layer 116 may include a benzocyclobutene (BCB) or photoresist acryl series.

The third insulating layers 115 and 116 includes a contact hole 163 to expose the drain electrode 143, a contact hole 164 to expose the storage capacitor auxiliary layer 144, and a contact hole 165 to expose the first electrode 136. In the contact hole 165, the second insulating layer 114 is also removed.

A transparent conductive layer is formed on the third insulating layer 115 and 116. The transparent conductive layer includes a pixel electrode 151, and a third electrode 152 to form the capacitance part Cc.

In general, the transparent conductive layer includes a transparent conductive material such as indium tin oxide (ITO), indium zinc oxide (IZO) or the like. The pixel electrode 151 is connected to the drain electrode 143 through the contact hole 163, and the third electrode 152 is connected to the first electrode 136 through the contact hole 165.

Further, the pixel electrode 151 is connected to the storage capacitor auxiliary layer 144 through the contact hole 164. Accordingly, a storage capacitor Cst including the storage capacitor auxiliary layer 144 to which a pixel voltage is applied, the second insulating layer 114 and the storage electrode line 133 is formed. A common voltage may be applied to the storage electrode line 133.

An insulating layer 114 is interposed between the storage capacitor auxiliary layer 144 and the storage capacitor line 133. The insulating layer 114 facilitates the forming of capacitance because it has a dielectric constant higher than that of the organic layer can be made thin.

The capacitance part Cc of the DC/DC converter 170 may have capacitance, which will be described later.

Referring to FIGS. 3 and 4, the second substrate 200 is formed as follows.

A black matrix 221 is formed on a second insulating substrate 211. The black matrix 221 includes an inner black matrix 221a and an outer black matrix 221b.

The inner black matrix 221a divides red, green, and blue filters from one another, and blocks light that directly travels toward the pixel thin film transistor Tp of the first substrate 100.

The outer black matrix 221b is formed in the non-display region along the circumference of the display region. The outer black matrix 221b blocks light that directly travels toward a thin film transistor (not shown) of the gate drivers 134 and 135 and the converter thin film transistor Tc.

The black matrix 221 includes a photoresist organic material that typically contains a black pigment. The black pigment includes carbon black, titanium oxide, or the like. The black matrix 221 may include metal such as chrome and/or chrome oxide.

A color filter 231 has a repeated pattern of red, green, and blue filters by employing the black matrix 221 as a boundary. The color filter 231 gives a color to light emitted from a backlight unit (not shown) and passing through the liquid crystal layer 300. The color filter 231 is typically made of a photoresist organic material.

An overcoat layer 241 is formed on the color filter 231 and the black matrix 221 that is not covered with the color filter 231. The overcoat layer 241 provides planar surface and protects the color filter 231. The overcoat layer 241 may include photoresist acryl resin.

A common electrode 251 is formed on the overcoat layer 241. The common electrode 251 includes a transparent conductive material such as ITO, IZO or the like. The common electrode 251 together with the pixel electrode 151 directly applies a voltage to the liquid crystal layer 300.

Figure 5:
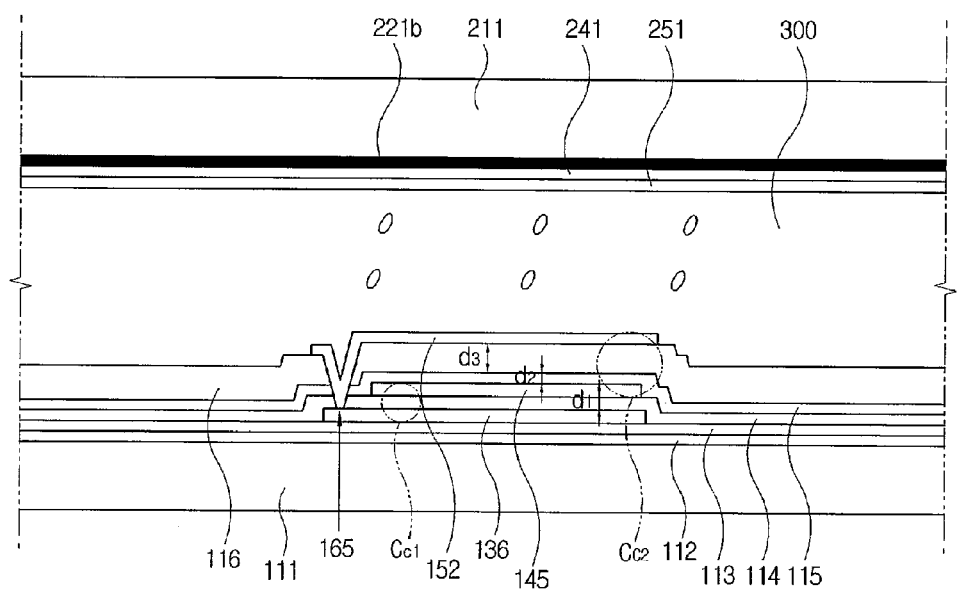
FIG. 5 is a view illustrating a capacitor of the DC/DC converter in the liquid crystal display device according to the first exemplary embodiment of the present invention.

Referring to FIG. 5, the capacitance part Cc of the DC/DC converter 170 will be described below.

The capacitance part Cc includes a first capacitance part Cc1 and a second capacitance part Cc2.

The first capacitance part Cc1 includes the first electrode 136, the second insulating layer (a first dielectric layer) 114, and the second electrode 145. The second capacitance part Cc2 includes the second electrode 145, the third insulating layer (a second dielectric layer) 115 and 116, and the third electrode 152. The third electrode 152 is connected to the first electrode 136 through the contact hole 165.

The thickness of the second insulating layer 114 ranges 3500 Å through 5500 Å. The thickness of the passivation layer 115 ranges 1500 Å through 2500 Å. The thickness of the organic layer 116 ranges 3 μm through 5 μm.

The capacitance C is expressed as "C=∈A/d." Here, "∈" is a dielectric constant of a dielectric layer, "A" is an area of the electrode, and "d" is a distance between two electrodes.

According to the first exemplary embodiment, the areas of the first and second capacitors Cc1 and Cc2 forming the capacitance part Cc are overlapped with each other, thereby forming a large capacitance in the same area "A." Accordingly, it is easy to design the liquid crystal display device 1 while reducing the area of the DC/DC converter 170.

An experimental comparison of forming the first capacitance part Cc1, only between the first electrode 136 and the second electrode 145 with forming the first capacitance part Cc1 together with the second capacitance part Cc2 using the contact hole 165 reveals that the area used to form the same capacitance is reduced by about 7%.

In the first exemplary embodiment, the liquid crystal layer 300 is placed between the second substrate 200 and the capacitance parts Cc1 and Cc2, but not limited thereto.

Alternatively, a sealant may be formed between the second substrate 200 and the capacitance parts Cc1 and Cc2.

Further, the capacitance parts Cc1 and Cc2 may be placed in the outer circumference of the sealant. Also, the second substrate 200 may not face the capacitance parts Cc1 and Cc2.

Below, a method of manufacturing the display device according to the first exemplary embodiment of the present invention will be described with respect to FIGS. 6A through 9B. FIGS. 6A, 7A, 8A, and 9A illustrate a manufacturing method for the part shown in FIG. 3, and FIGS. 6B, 7B, 8B, and 9B illustrate a manufacturing method for the part shown in FIG. 5.

Figure 6A:
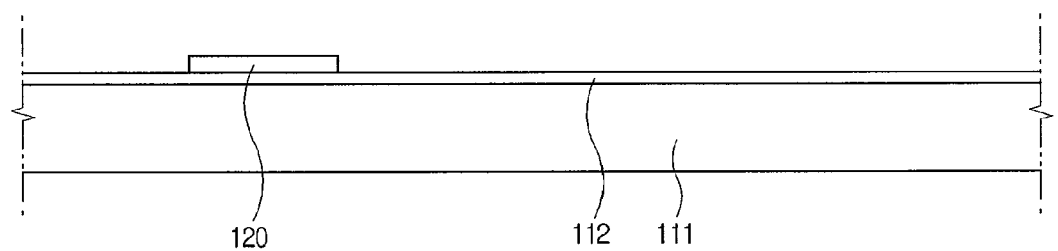
FIG. 6A through 9B are views for explaining a method of manufacturing the liquid crystal display device according to the first exemplary embodiment of the present invention.
Figure 6B:
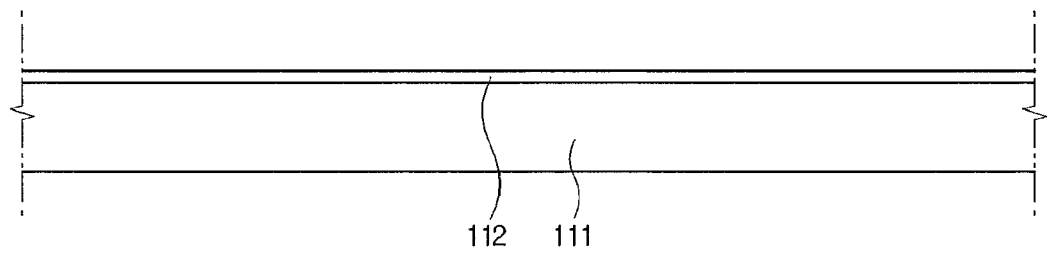

As shown in FIGS. 6A and 6B, the buffer layer 112 and the semiconductor layer 120 are formed on the first insulating substrate 111. At this time, the semiconductor layer 120 includes poly silicon, which is not doped with impurities.

The buffer layer 112 is generally deposited by chemical vapor deposition using silicon source gas and oxygen source gas.

As a method of forming the semiconductor layer 120, there have been developed a method of directly depositing poly silicon on the first insulating substrate 111 at a high temperature; a high temperature crystallization method of depositing an amorphous silicon layer and crystallizing it at a high temperature of about 600° C.; an excimer laser annealing (ELA) method or a sequential layer annealing (SLS) method of depositing an amorphous silicon layer and annealing it using a laser or the like; a metal induced crystallization (MIC) of changing a phase of an amorphous silicon layer using metal; etc.

The present invention may employ any method to form poly silicon.

Figure 7A:
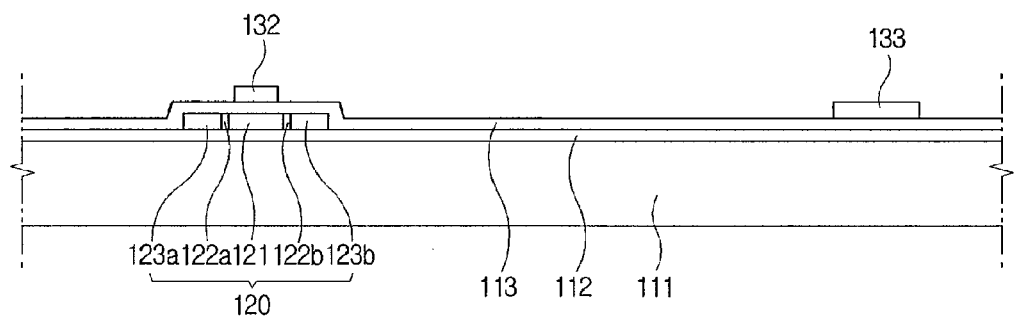
Figure 7B:
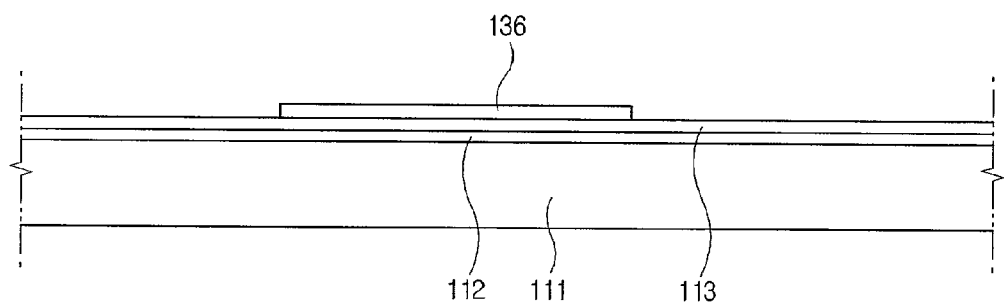

Then, as shown in FIGS. 7A and 7B, the first insulating layer 113 is formed, and the gate wiring is formed on the first insulating layer 113. The first insulating layer 113 may be formed by the chemical vapor deposition, and the gate wiring may be formed by forming a metal layer and patterning it.

Then, n-type impurities are ion-injected using the gate electrode 132 as a mask, thereby forming the channel region 121, the LDD 122a and 122b, the source/drain regions 123a and 123b.

There are various methods for manufacturing the LDD 122a and 122b. For example, the gate electrode 132 is formed as a double layer and wet etched to form an overhang for forming of the LDD 122a and 122b.

Figure 8A:
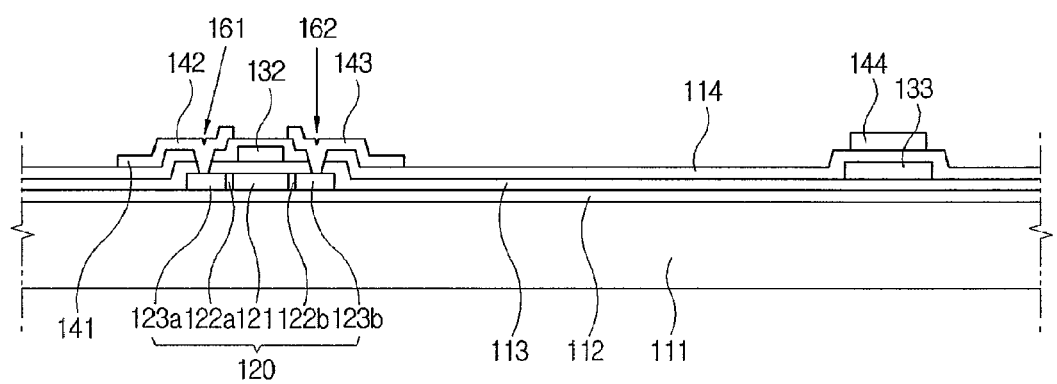
Figure 8B:
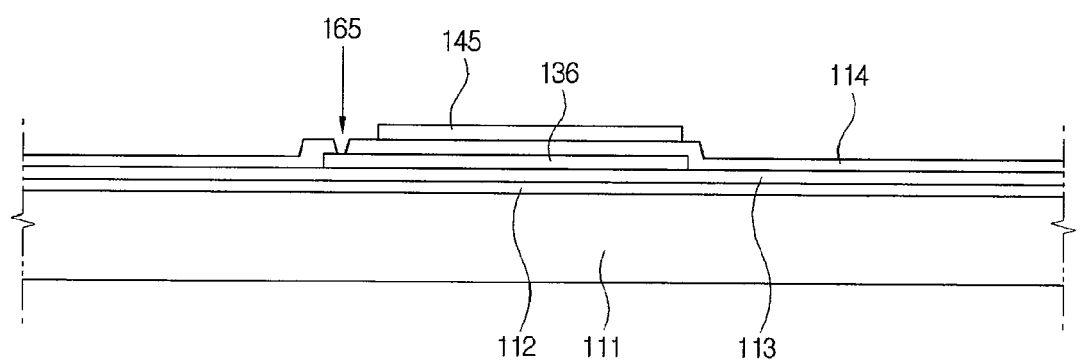

As shown in FIGS. 8A and 8B, the second insulating layer 114 is formed, and the contact holes 161 and 162 are formed on the second insulating layer 114 by photolithography. Then, the data wiring is formed. Here, the second insulating layer 114 may be formed by the chemical vapor deposition, and the data wiring may be formed by forming a metal layer and patterning it.

Figure 9A:
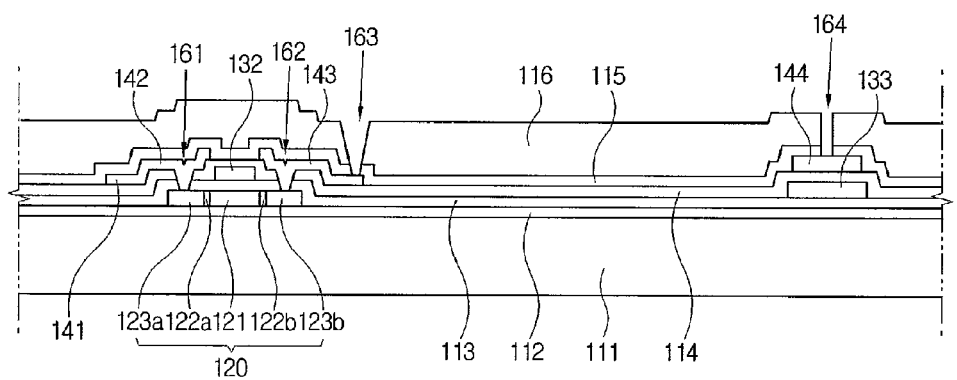
Figure 9B:
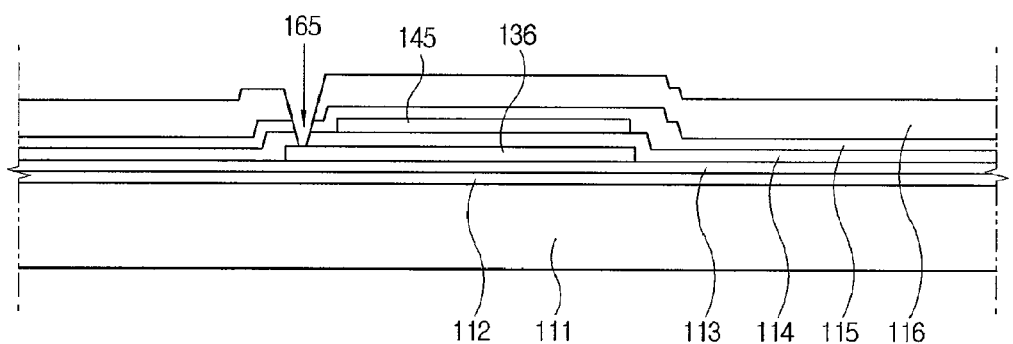

As shown in FIGS. 9A and 9B, the third insulating layer 115 and 116 is formed, and the contact holes 163 and 164 are formed on the third insulating layers 115 and 116.

The passivation layer 115 may be formed by the chemical vapor deposition, and the organic layer 116 may be formed by spin coating, slit coating, screen printing, or the like.

Then, the transparent conductive layer is formed, thereby completing the first substrate 100 as shown in FIGS. 3 and 5. In the manufacturing method of the first substrate 100 as described above, the gate driver 134, 135 and the converter thin film transistor Tc of the DC/DC converter 170 are also formed on the first insulating substrate 111.

It will be understood that known methods can be used in manufacturing the second substrate 200, assembling two substrates 100 and 200, injecting the liquid crystal layer 300, mounting the driving chip 400, connecting the driving chip 400 and the circuit board 500, of which descriptions are omitted.

Figure 10:
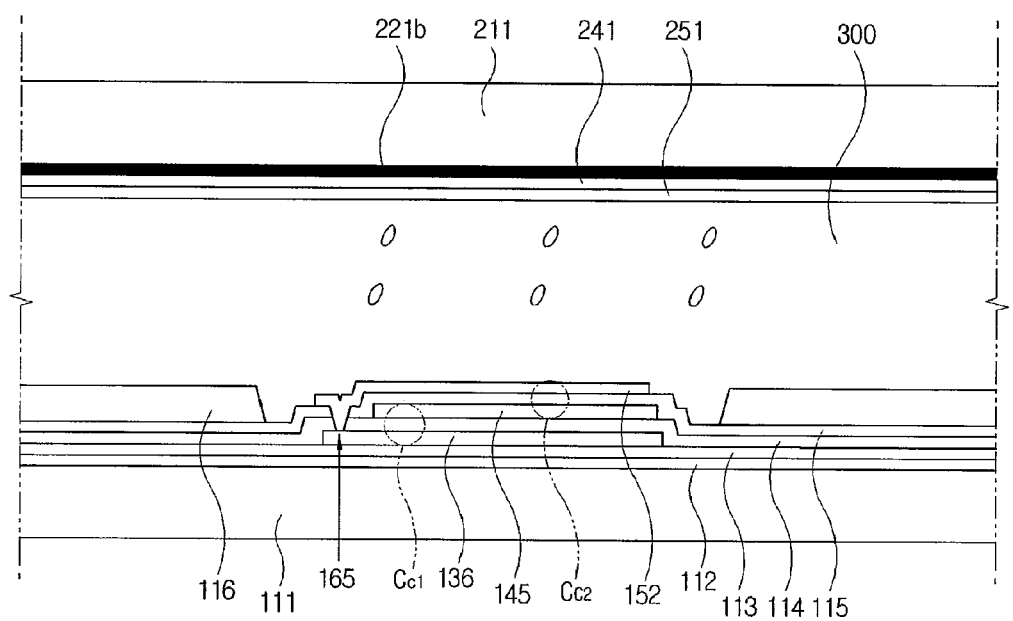
FIG. 10 is a view illustrating a capacitor of a DC/DC converter in a liquid crystal display device according to a second exemplary embodiment of the present invention.

A second exemplary embodiment of the present invention will be described with reference to FIG. 10.

In the second exemplary embodiment, a second capacitance part Cc2 does not include an organic layer 116. In a process of manufacturing the organic layer 116, a patterning process is needed for forming the contact holes 163 and 164. In this patterning process, the organic layer 116 may be removed from the second capacitance part Cc2.

The second capacitance part Cc2 includes only a passivation layer 115 as an organic layer. A dielectric layer of the second capacitance part Cc2 is thin and has a high dielectric constant because there is no dielectric layer 116 that is thick and has a low dielectric constant. Thus, the capacitance of the second capacitance part Cc2 increases with regard to the same area.

Figure 11:
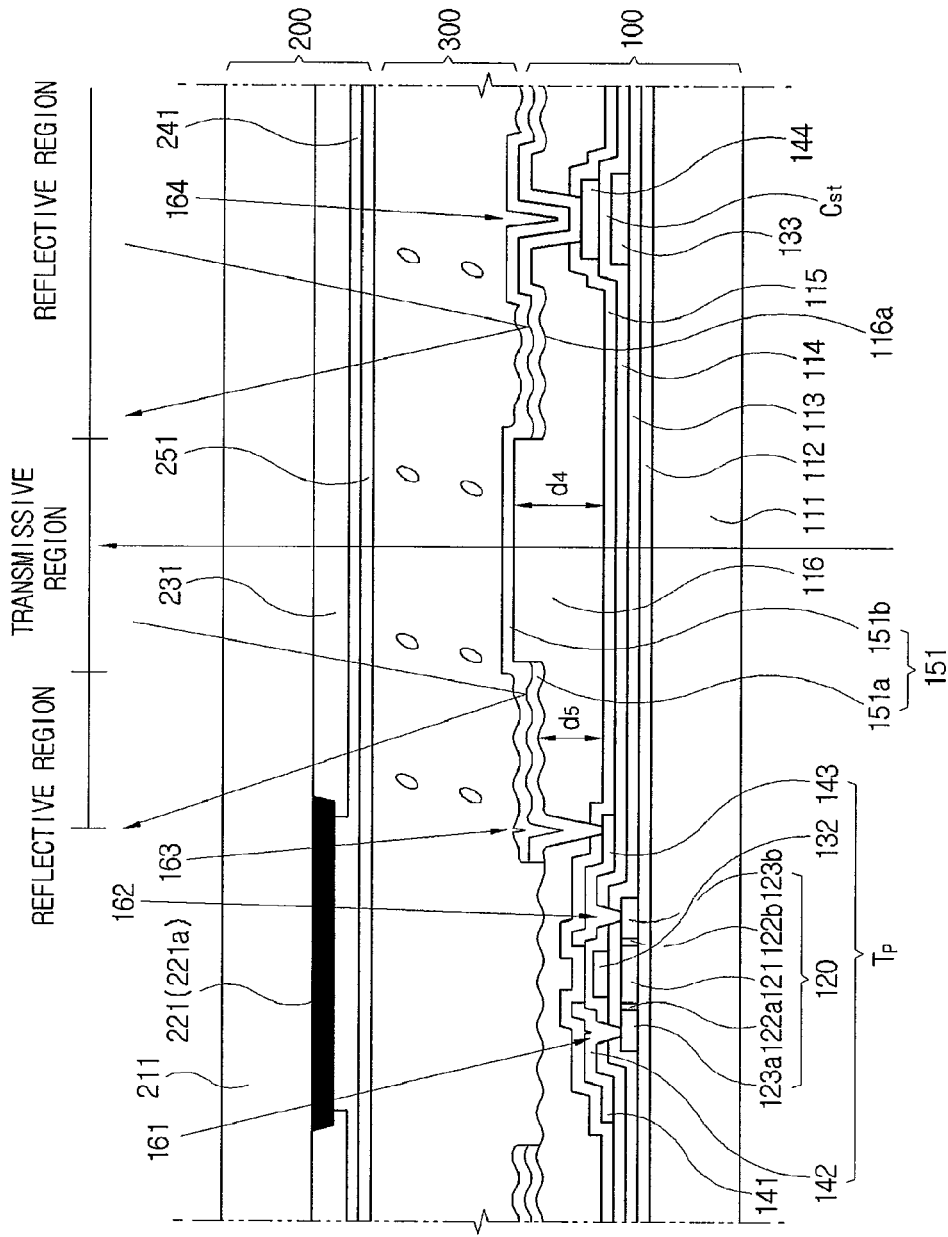
FIG. 11 is a sectional view of a liquid crystal display device according to a third exemplary embodiment of the present invention.

A third exemplary embodiment of the present invention will be described with reference to FIGS. 11 and 12.

A pixel electrode 151 includes a lower first layer 151a and an upper second layer 151b. The first layer 151a includes a reflective metal layer, and the second layer 151b includes a transparent conductive layer.

The first layer 151a may include aluminum, aluminum alloy, silver, palladium, silver alloy, etc. Here, the silver alloy generally contains silver of 98.1 weight %, palladium of 0.9 weight %, and copper of 1 weight %, which is not corroded even if it contacts the transparent conductive second layer 151b. A region where the first layer 151a is placed is a reflective region that does not transmit light emitted from a backlight unit (not shown) placed under the first insulating substrate 111. On the other hand, external light incident to the second substrate 200 is reflected from this region toward the outside.

A region where the first layer 151a is not placed is a transmissive region that transmits the light emitted from the backlight unit (not shown) placed under the first insulating substrate 111, thereby transmitting the light through the second substrate 200. On the other hand, external light incident to the second substrate 220 is not reflected from this region.

The liquid crystal display device according to the third exemplary embodiment of the present invention includes a transflective type pixel electrode 151 having both the reflective region and the transmissive region. Such a transflective liquid crystal display device can use not only the backlight unit under a dark place but also external light under a bright place. The transflective liquid crystal display device can secure a constant brightness regardless of an external environment, and limits the use of the backlight unit under the bright place, thereby reducing power consumption of the backlight unit.

A lens pattern 116a is formed on an organic layer 116 in the reflective region. The lens pattern 116a causes a pixel electrode 151 in the reflective region to have a lens shape, thereby increasing a reflectivity.

The lens pattern 116a is formed by exposing a photoresist layer through a slit mask and developing and reflowing the exposed photoresist layer. In this stage, the thickness of the organic layer 116 decreases, so that the thickness d5 of the organic layer in the reflective region is smaller than the thickness d4 in the transmissive region.

Figure 12:
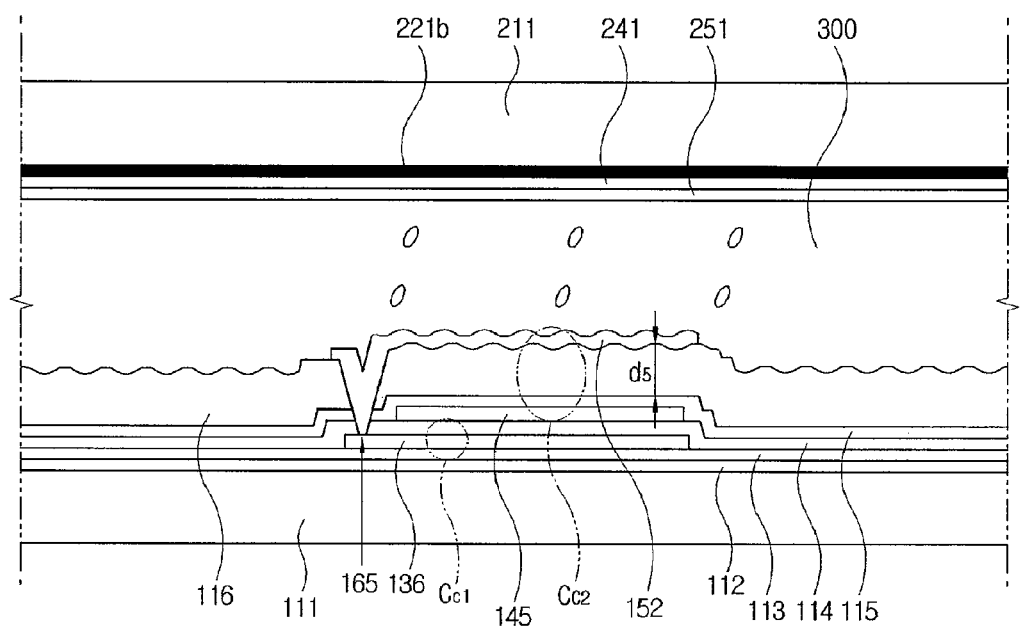
FIG. 12 is a view illustrating a capacitor of a DC/DC converter in the liquid crystal display device according to the third exemplary embodiment of the present invention.

Referring to FIG. 12, the organic layer 116 of the second capacitance part Cc2 is formed with the lens pattern 116a, and has the same thickness as the thickness d5 in the reflective region. Accordingly, the second capacitance part Cc2 decreases in the thickness of the dielectric layer, so that the capacitance increases as compared with that of the first exemplary embodiment. The third electrode 152 of the second capacitance part Cc2 includes both the first layer 151a and the second layer 151b, or includes either of the first layer 151a or the second layer 151b.

In experiment result, a comparison of forming the first capacitance part Cc1 only between the first electrode 136 and the second electrode 145 with forming the first capacitance part Cc1 together with the second capacitance part Cc2 using the contact hole 165 shows that the same capacitance can be formed with an area reduced by about 13%.

Figure 13:
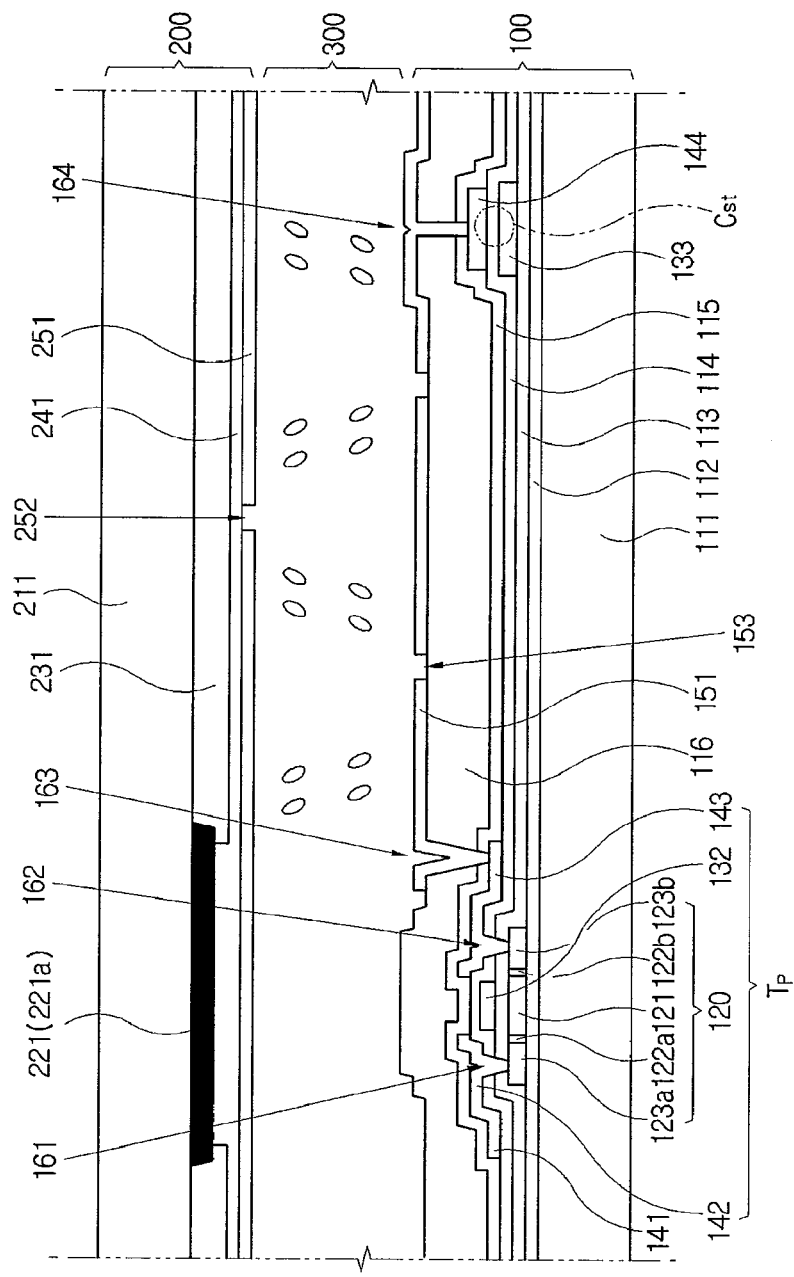
FIG. 13 is a sectional view of a liquid crystal display device according to a fourth exemplary embodiment of the present invention.

A fourth exemplary embodiment of the present invention will be described with reference to FIGS. 13 and 14.

At least one of the pixel electrode 151 and the common electrode 251 is formed with a domain defining member. As shown in FIG. 13 according to the fourth exemplary embodiment, the domain defining member includes a pixel electrode cutting pattern 153 formed at the pixel electrode 151 and a common electrode cutting pattern 252 formed at the common electrode 251. Alternatively, the domain defining member may include a protrusion part formed on at least one of the pixel electrode 151 and the common electrode 251.

A liquid crystal layer 300 is in a vertically aligned (VA) mode when, in the absence of an applied voltage, the long axis of liquid crystal molecules is vertically aligned. If voltage is applied to the liquid crystal layer 300, the long axis of the liquid crystal molecules with negative dielectric anisotropy are oriented perpendicularly to the electric field.

However, if the cutting patterns 153 and 252 are not formed, the liquid crystal molecules are arranged in disorder because their lying direction is not determined. Thus, a disinclination line is formed at a boundary between different lying directions. The cutting patterns 153 and 252 make a fringe field when the voltage is applied to the liquid crystal layer 300, thereby determining the lying direction of the liquid crystal molecules.

Further, the liquid crystal layer 300 is divided into a plurality of regions according to positions of the cutting patterns 153 and 252, the divided regions are different in the lying direction of the liquid crystal molecule, thereby enhancing a view angle.

Figure 14:
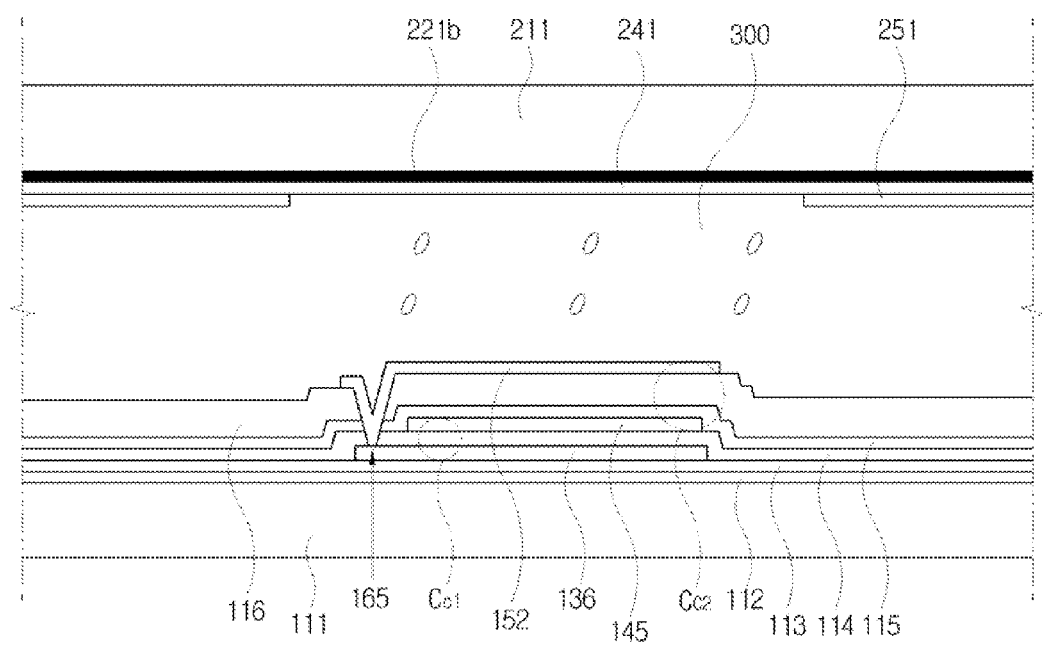
FIG. 14 is a view illustrating a capacitor of a DC/DC converter in the liquid crystal display device according to the fourth exemplary embodiment of the present invention.

Referring to FIG. 14, a second substrate 200 corresponding to a third electrode 152 is not formed with a common electrode 251. Because the common electrode 251 requires a patterning process for forming the common electrode cutting pattern 252, the common electrode 251 corresponding to the third electrode 152 is removed during the patterning process without additional process.

Coupling may exist between the third electrode 152 and the common electrode 251. According to the fourth exemplary embodiment, the coupling is suppressed without an additional process for removing the coupling.

As described above, the present invention provides a liquid crystal display device including a high capacitance DC/DC converter that is mounted on a substrate without occupying a relatively large area.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A thin film transistor substrate comprising:
    a pixel formed on a display region, the pixel including a pixel electrode and a storage capacitor, and
    a capacitor formed on a non-display region,
    wherein the capacitor comprises:
        a first electrode formed on a insulating substrate;
        a first dielectric layer formed on the first electrode;
        a second electrode formed on the first dielectric layer;
        a second dielectric layer formed on the second electrode; and
        a third electrode formed on the second dielectric layer, the third electrode electrically connected to the first electrode.

2. The thin film transistor substrate according to claim 1, wherein the first dielectric layer comprises at least two sub-layers.

3. The thin film transistor substrate according to claim 1, wherein the second dielectric layer comprises at least two sub-layers.

4. The thin film transistor substrate according to claim 1, wherein the third electrode comprises a transparent conductive layer.

5. The thin film transistor substrate according to claim 1, wherein
    the first dielectric layer and the second dielectric layer includes a contact hole; and
    the first electrode and the third electrode are electrically connected to each other through the contact hole.

6. The thin film transistor substrate according to claim 1, further comprising: an insulating layer between the insulating substrate and the first electrode.

7. The thin film transistor substrate according to claim 1, wherein the second dielectric layer comprises an organic layer.

8. The thin film transistor substrate according to claim 1, the pixel further comprising a gate wiring including a gate electrode, and a data wiring including a source electrode and a drain electrode,
    wherein the gate wiring is formed on the same layer with the first electrode, the data wiring is formed on the same layer with the second electrode, and the pixel electrode is formed on the same layer with the third electrode.

9. The thin film transistor substrate according to claim 1, wherein the storage capacitor comprises:
a first electrode formed on the insulating substrate of the thin film transistor substrate,
a first dielectric layer formed on the first electrode,
a second electrode formed on the first dielectric layer,
a second dielectric layer formed on the second electrode, the second dielectric layer having a first contact hole, and
a third electrode formed on the second dielectric layer, the third electrode electrically connected to the second electrode.

10. The thin film transistor substrate according to claim 9, wherein the pixel further includes a common electrode opposite the pixel electrode, and
wherein the common electrode is removed from a location opposite the capacitor.

11. The thin film transistor substrate according to claim 10, wherein the first electrode of the storage capacitor and the first electrode of the capacitor are formed of a gate metal,
wherein the second electrode of the storage capacitor and the first electrode of the capacitor are formed of a data metal, and
wherein the third electrode of the storage capacitor and the third electrode of the capacitor are formed of a transparent conductive layer.

12. The thin film transistor substrate according to claim 9, wherein the first electrode of the storage capacitor and the first electrode of the capacitor are formed of a gate metal,
wherein the second electrode of the storage capacitor and the second electrode of the capacitor are formed of a data metal, and
wherein the third electrode of the storage capacitor and the third electrode of the capacitor are formed of a transparent conductive layer.

13. The thin film transistor substrate according to claim 1, wherein the pixel further includes a common electrode opposite the pixel electrode, and
wherein the common electrode is removed from a location opposite the capacitor.

14. The thin film transistor substrate according to claim 13, wherein the first electrode of the storage capacitor and the first electrode of the capacitor are formed of a gate metal,
wherein the second electrode of the storage capacitor and the second electrode of the capacitor are formed of a data metal, and
wherein the third electrode of the storage capacitor and the third electrode of the capacitor are formed of a transparent conductive layer.

15. The thin film transistor substrate according to claim 1, wherein the first electrode of the storage capacitor and the first electrode of the capacitor are formed of a gate metal,
wherein the second electrode of the storage capacitor and the second electrode of the capacitor are formed of a data metal, and
wherein the third electrode of the storage capacitor and the third electrode of the capacitor are formed of a transparent conductive layer.

\* \* \* \* \*